T. C. LAW.
Broiler and Toaster.
No. 51,064. Patented Nov. 21, 1865.
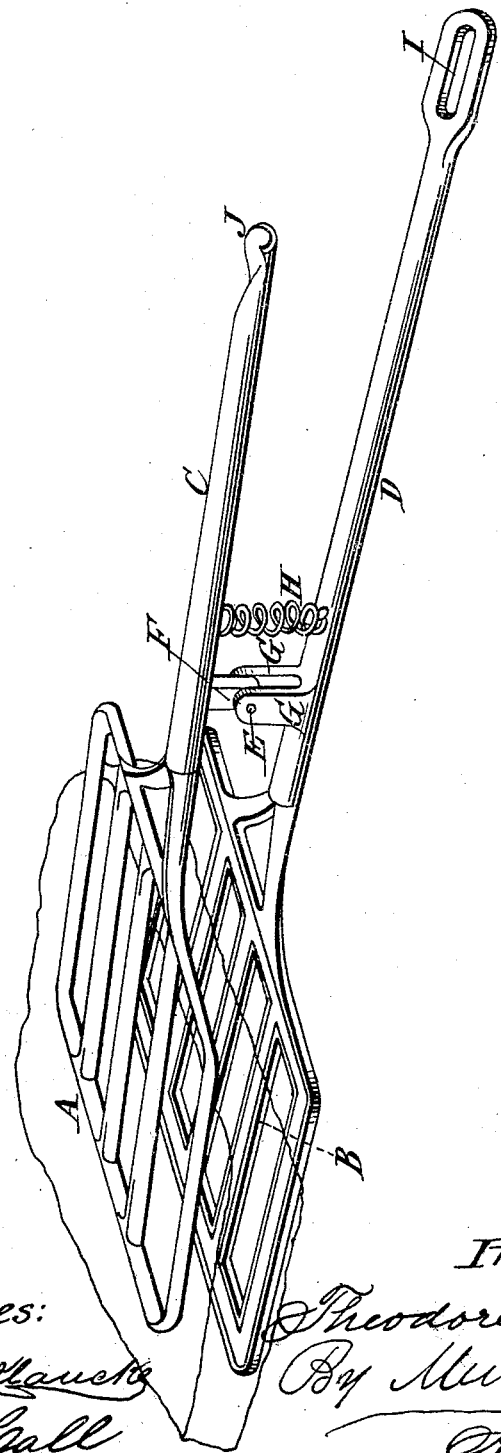
Witnesses:
Alexr. A. C. Klauske
W. F. Hall
Inventor:
Theodore C. Law
By Munn & Co
Attorneys

UNITED STATES PATENT OFFICE.

THEODORE C. LAW, OF GREEN ISLAND, NEW YORK.

BROILER AND TOASTER.

Specification forming part of Letters Patent No. 51,064, dated November 21, 1865.

*To all whom it may concern:*

Be it known that I, THEODORE C. LAW, of Green Island, Albany county, State of New York, have made new and useful Improvements in Appliances for Toasting or Broiling; and I do hereby declare the following to be a full, clear, and exact description of the nature, construction, and operation of the same, reference being had to the accompanying drawing, which is made part of this specification, in which my improvement is represented by a perspective view.

The device consists of a pair of spring-jaws hinged together so as to retain the bread or meat between their grated surfaces.

To enable one skilled in the branch of manufacture to which my invention appertains to construct and use the same, I will proceed to describe it.

A B are the two grated surfaces, whose handles C D are hinged by means of a pin, E, which passes through the lugs F G, which project from the respective handles. A spring, H, expanding longitudinally against the inner sides of the handles, causes the grated surfaces A B to approach each other and gripe the bread or meat, as the case may be.

One or both of the surfaces A B may be grooved or channeled, so as to retain the gravy, or the apparatus may be made lightly of wire for toasting.

One handle, being longer than the other, has a loop, I, by which it may be hung up when disused, and the other has a thumb-piece, J, which receives the pressure to unclasp the food which is embraced between the grated surfaces.

The handles are japanned and the grated surfaces tinned.

Having described my invention, what I claim therein as new, and desire to secure by Letters Patent, is—

As an article of manufacture, the broiler or toaster constructed as described and represented.

THEODORE C. LAW.

Witnesses:
  WILLIAM GILFILLAN,
  WM. DONOHUE.